United States Patent Office 3,073,783
Patented Jan. 15, 1963

3,073,783
LUBRICATING SUSPENSION OF LANOLIN IN REFINED SPERM OIL, AND METHODS OF PREPARING
George F. Chmelik, Downers Grove, and John Danaczko, Jr., Oak Park, Ill., assignors to Western Electric Company, Incorporated, New York, N.Y., a corporation of New York
No Drawing. Filed Feb. 18, 1960, Ser. No. 9,427
4 Claims. (Cl. 252—56)

The present invention relates generally to certain new compositions of matter that are especially useful as lubricants and to methods of preparing such compositions, and more particularly to lubricants that may be sprayed onto the operative portions of automatic molding presses for pulverulent material.

Accordingly, an object of the invention is to provide certain new compositions of matter that are especially useful as lubricants and methods of preparing such compositions.

A related object of the invention is to provide new and useful lubricants, particularly such as may be sprayed onto objects to be lubricated.

A further object of the invention is to provide new and improved lubricants that may be sprayed onto the operative portions of molding presses for pulverulent material.

In the manufacture of permalloy dust cores for loading coils in the telephone industry, it is required to compress a mixture of permalloy powder coated with a composite inorganic insulating material into a ring. According to one embodiment of the process, disclosed in A. F. Bandur Patent 2,105,070, permalloy particles are insulated with about 1.25% by weight of a mixture of magnesium hydroxide, sodium silicate, and talc in three stages. The insulated particles are compressed in an automatic molding press at a pressure of approximately 200,000 p.s.i. after each application of the insulation. The core is fired at a temperature of 1000 to 1200° F. after the last insulating and compressing operation to produce the finished product.

Another object of the invention is to provide new and improved lubricating compositions which may be sprayed onto the operative portions of automatic molding presses for insulated permalloy particles, which lubricants do not react adversely with the composition being compressed and are vaporized completely when the compressed articles are fired.

With the foregoing and other objects in view, a new composition of matter illustrative of the invention and useful as a lubricant, consists of an anhydrous suspension of lanolin in refined sperm oil from which all spermacetti has been substantially completely removed. The lanolin constitutes between about 5 and 30% by weight of the mixture, preferably between about 15 and 20% of the mixture, and exists principally in the form of 2–15 micron needlelike crystals suspended in the sperm oil. This lubricant is prepared by heating and mixing the ingredients until the lanolin dissolves, followed by slow cooling whereby a substantial portion of the lanolin crystalizes out.

Example

According to one specific example of the invention, 55 grams of U.S.P. lanolin are blended with 275 milliliters of an aerated, refined sperm oil from which all spermacetti has been substantially completely removed. Such a refined sperm oil is available commercially from the Archer-Daniels-Midland Company under the designation "Polysperm 300," which has a Saybolt universal viscosity of 280–300 seconds at 100° F. and a specific gravity of about 0.925 at 60° F. Raw sperm oil, as obtained from whale blubber, consists essentially of a homogeneous admixture of spermacetti, a waxy constituent and a relatively light oil constituting the "refined sperm oil" used in the present invention. The two constituents are separated and are sold separately on a commercial basis.

The mixture of 55 grams lanolin and 275 milliliters of refined sperm oil yields approximately 17.9% by weight of lanolin. Although mixtures of between 5 and 30% lanolin are suitable for various applications, a mixture of 15 to 20% is preferred for most molding applications.

The mixture of lanolin and sperm oil is stirred vigorously, which gives off heat, and is heated additionally where necessary to a temperature sufficient to provide solution of the lanolin in the refined sperm oil. A heating temperature of about 140° F. is sufficient to provide the required solution in most cases. The mixture is then allowed to cool slowly to room temperature, as by simply removing both the heat and the stirring. As the mixture cools, a substantial portion of the lanolin crystallizes out and goes into suspension in the form of fine needlelike crystals having a thickness of the order of 2–15 microns and of varying length. The material is now ready for use as a lubricant for a wide variety of objects, preferably without the addition of any other material such as solvents, thinners or emulsifying agents. Specifically, it is desired to provide an anhydrous mixture, and no water is added at any stage of the process.

The lubricant may be applied as needed to the parts to be lubricated, and preferably is automatically applied even to moving parts by ordinary spraying techniques. An important aspect of the invention is that the material is sufficiently fluid (a viscosity of approximately 407 seconds, Saybolt universal viscosity, at 100° F.) and the lanolin crystals are fine enough so that the lubricant may readily be sprayed onto the moving parts, such as the platens, dies, etc. of automatic molding presses used in compressing core rings from permalloy powder coated with inorganic insulating material as previously described. Mineral lubricants are usually absorbed by the particles of talc used in insulating core rings, which absorption sometimes produces unsatisfactory cores; whereas, the subject lubricant is not so absorbed. In addition, any lubricant that is compressed into the core is vaporized completely on the firing of the core and leaves substantially no ash or residue.

The lubricant suspension of the invention has the following important properties, among others:
(1) A.P.I. gravity 21;
(2) Flash point 430° F. (Cleveland Open Cup);
(3) Fire point 520° F. (Cleveland Open Cup);
(4) Saybolt universal viscosity at 76° F.—1755 seconds, at 100° F.—407 seconds, and at 210° F.—69.8 seconds;
(5) The lubricant has extreme pressure characteristics;
(6) The lubricant has excellent adhesive and cohesive properties;
(7) The uniform light suspension permits spraying onto the parts to be lubricated to permit automatic application;
(8) The suspension is completely combustible leaving no ash or residue;
(9) The suspension is not adversely affected by light or ambient temperature; and
(10) The material is not absorbed by various inorganic materials, and particularly not by talc.

Although one specific example of the invention has been described in detail hereinabove, it will be obvious that various modifications may be made from the specific

What is claimed is:

1. As a new composition of matter, an anhydrous suspension of finely divided lanolin a substantial portion of which exists in the form of 2–15 micron needlelike crystals suspended in refined sperm oil from which all spermacetti has been substantially completely removed, the lanolin constituting between 5 and 30% by weight of the mixture.

2. The composition recited in claim 1 wherein the lanolin comprises between 15 and 20% by weight of the mixture.

3. The method of preparing a lubricant, which comprises the steps of heating and thoroughly mixing 85 to 80% by weight of an aerated refined sperm oil from which substantially all spermacetti has been removed with 15 to 20% by weight of U.S.P. lanolin until the lanolin dissolves in the refined sperm oil, and then cooling the mixture slowly to room temperature whereby a substantial portion of the lanolin crystallizes out into 2–15 micron needlelike crystals which are suspended in the refined sperm oil.

4. The method as recited in claim 3, wherein the mixture of lanolin and refined sperm oil is heated to a maximum temperature of about 140° F. prior to the cooling step.

References Cited in the file of this patent

UNITED STATES PATENTS

| | | |
|---|---|---|
| 2,276,453 | Bandur | Mar. 17, 1942 |
| 2,605,224 | Jahn | July 29, 1952 |

OTHER REFERENCES

Bastian: "Metalworking Lubricants," McGraw-Hill Co., Inc., 1951, pages 106–132.